March 29, 1938.   W. L. SMITH   2,112,716
CIRCUIT CONTROL DEVICE
Filed Oct. 1, 1935   2 Sheets-Sheet 2

INVENTOR
Ward L. Smith,
BY Justin W. Macklin
ATTORNEY

Patented Mar. 29, 1938

2,112,716

UNITED STATES PATENT OFFICE 2,112,716

CIRCUIT CONTROL DEVICE

Ward L. Smith, Bedford, Ohio, assignor to The Electric Controller & Manufacturing Company, Cleveland, Ohio, a corporation of Ohio Application October 1, 1935, Serial No. 43,030

10 Claims. (Cl. 219—4)

This invention relates to improvements in the operation of heating devices, welding machines and similar devices having automatic operation wherein a certain sequence of operation is desired.

The invention relates more particularly to spot welding machines in which the electrodes are forced against the work-piece under pressure and in which it is desired to have the electrodes in electrical contact with the work-piece prior to the turning on of the welding circuit.

It is necessary in the functioning of a welder, such as a spot welder which is operated at very high speed, that in each succeeding operation, the electrodes be in electrical contact with the work-piece before the welding current is applied to the electrodes, in order to prevent the burning of the electrodes and the work-piece.

In the past, pressure switches have been used for this purpose. Pressure being applied to a piston, it moves quickly so as to clamp the electrodes on the work-piece. This clamping stops the movement of the piston. The pressure then builds up to the normal amount, operating the pressure switch which closes the welder contactor.

In practical use, it has been found that due to the inertia of the moving piston or due to a high return spring pressure, the pressure may build up in the pipe line to the normal amount before the piston starts to move, causing the pressure switch to act, closing the contactor before the piston has actually caused the electrodes to clamp on the work-piece. This premature closing of the welder contactor is likely to cause severe burning of the electrodes and the work-piece when these are clamped together with the electrodes energized.

It is therefore a principal object of this invention to provide a simple effective means to prevent premature closing of the welder contactor and which shall cause closing of this contactor consequent upon the actual contact made by the electrodes on the work-piece.

Another object of this invention is to insure the correct sequence of events in the process of applying the electrodes to the work-piece followed by the energization of the welding circuit.

A further object of this invention is to secure automatic operation of the circuits of a heating or welding machine, thereby securing correct operation as to the sequence of steps of operation, without the attention of an operator.

Other objects will appear as my invention is described hereinafter.

In the drawings accompanying this specification and forming a part of this application, I have shown for purposes of illustration, certain embodiments which my invention may assume and in these drawings,—

Figure 1:
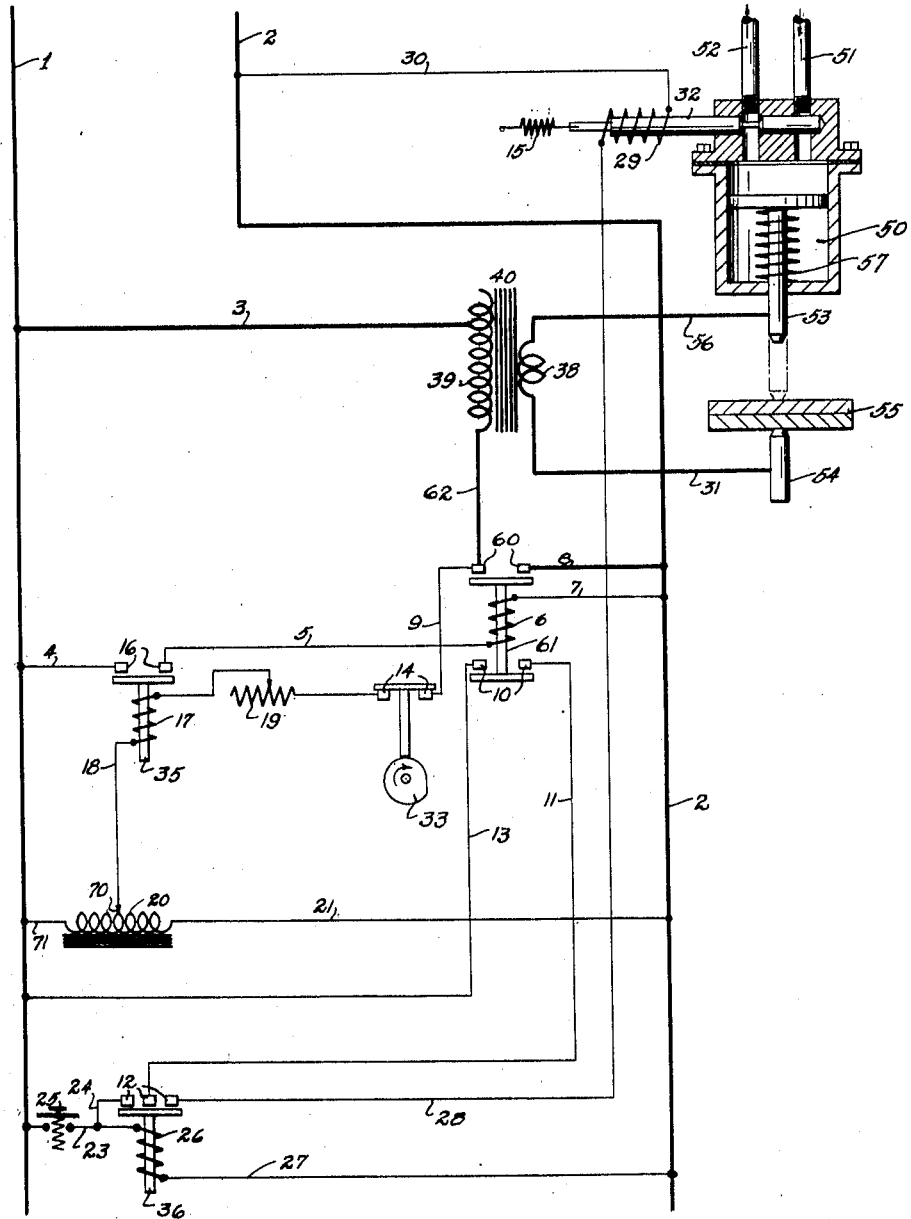
Fig. 1 is a schematic diagram of one embodiment of my invention.

The embodiment of my invention disclosed in Fig. 1 includes the schematic showing of such an arrangement of parts of a spot welding machine (not completely shown) comprising an inlet fluid conduit 51, an outlet fluid conduit 52, a control valve 32 which controls the flow of fluid in the conduits 51 and 52, a movable electrode 53, and a stationary electrode 54. The movable electrode 53 is moved by fluid in the cylinder 50 against a spring 57 into engagement with the work-pieces 55, here shown also in engagement with the stationary electrode 54.

Included in the work circuit is shown a welding transformer 40 having a primary winding 39 and a secondary winding 38. The movable electrode 53 is connected to the secondary winding 38 through conductor 56, and the stationary conductor 54 is connected to the secondary winding 38 through the conductor 31.

When a source of supply is connected to supply lines 1 and 2, there is a circuit energized from the supply line 1 through conductor 3, primary winding 39, of the welding transformer 40, conductors 62 and 9, normally closed contacts 14, of a timer 33, resistance 19, preferably variable, winding 17 of relay switch 35, conductor 18, to an intermediate tap 70 of auto-transformer 20, conductor 21 to the supply line 2, this circuit to be known as the relay circuit.

Another circuit is energized upon the application of a source of energy to the supply lines, including supply line 1, conductor 71, auto-transformer 20, conductor 21 to the supply line 2. This circuit is herein referred to as the auto-transformer circuit.

Due to the impedance of the primary winding 39 of the welding transformer 40, sufficient current does not flow through the winding 17 of relay 35 to close its contacts 16. Thus the main work circuit is not yet closed.

The closure of a push button 25 energizes a winding 26 of a relay 36 by the completion of a circuit from the supply line 1 through push button 25, conductor 23, winding 26 of relay 36, conductor 27 to the supply line 2. This circuit is referred to as the push button circuit.

The energization of the winding 26 of the relay 36 closing its contacts 12, completes the circuit from supply line 1 through the push button 25, conductors 23 and 24, contacts 12 of relay 36, conductor 28, winding 29 of valve 32, conductor 30 to a supply line 2. This energization of the winding 29 operates the valve 32 against a compression spring 15, closing the outlet fluid conduit 52 and opening the inlet fluid conduit 51, allowing the pressure to enter the cylinder 50, thereby causing the movable electrode 53 to move against a spring 57 into electrical contact with the work-pieces 55 located between the electrodes 53 and 54, and thereby causing a short circuit of the secondary winding 38 of the welding transformer 40.

Short circuiting this secondary winding 38 of the welding transformer 40 reduces the impedance of primary winding 39 of transformer 40, allowing sufficient current to flow through the winding 17 of relay 35, to energize it sufficiently to close its normally open contacts 16.

Closure of the contacts 16 of relay 35 completes a circuit from supply line 1, conductor 4, contacts 16 of relay 35, conductor 5, winding 6 of the main work circuit switch 61, conductor 7 to the supply line 2. This circuit is herein called the energization circuit for the welding switch.

The energization of the winding 6 of the welding switch 61 causes the closure of contacts 60 and 10. Closure of contacts 60 completes the work circuit, whereupon the period of welding begins.

This circuit includes the supply line 1, conductor 3, primary winding 39 of welding transformer 40, conductor 62, contacts 60 of main switch 61, conductor 8 to the supply line 2.

The closure of contacts 60 of the welding switch 61 also closes a holding circuit for the winding 17 of relay 35, from supply line 1, conductor 71, the left hand portion of the auto-transformer winding 20 to the tap 70, conductor 18, relay winding 17, resistance 19, timer contacts 14, conductor 9, contacts 60 of the main welding switch 61, conductor 8, to the supply line 2. This is to insure the continuance of the energization of winding 17 of relay 35 from the time of closing of the contacts 60 of the main switch 61 until the opening of the timer contacts 14.

Closure of contacts 10 of the main switch 61 completes a holding circuit for the said push button circuit, insuring a continuance of the closure of contacts 12 of relay 36, and permitting the push button 25 to be released. This holding circuit includes conductor 13 from the supply line 1, contacts 10 of welding switch 61, conductor 11, contacts 12 of relay 36, conductor 24, winding 26 of relay 36, conductor 27 to the supply line 2.

The welding period continues until the actuation of the timer 33 opens its contacts 14, which results in a deenergization of the winding 17 of relay 35, opening its contacts 16, whereby the energization circuit of the winding 6 of the main switch 61 is opened, causing the opening of its contacts 60 and 10. The opening of contacts 60 opens the work circuit, and the opening of the contacts 10 of the main welding switch 61 opens the holding circuit of the winding 26 of relay 36.

The push button 25 having been opened previously, the circuit through winding 26 of relay 36 being now opened, causes a deenergization of the winding 26, opening the contacts 12 and deenergizing the winding 29 of control valve 32, permitting the spring 15 to return the valve 32 to the position shown.

The return movement of valve 32 releases the pressure in the cylinder 50, whereby the movable electrode 53 is moved away from the work-pieces 55 and the stationary electrode 54 by the spring 57.

At this time all the circuits being opened excepting that of the relay circuit and that of the auto-transformer circuit, which remain closed, upon the application of a source of energy from the supply lines 1 and 2, the control device is ready for another welding operation.

Figures 2, 3:
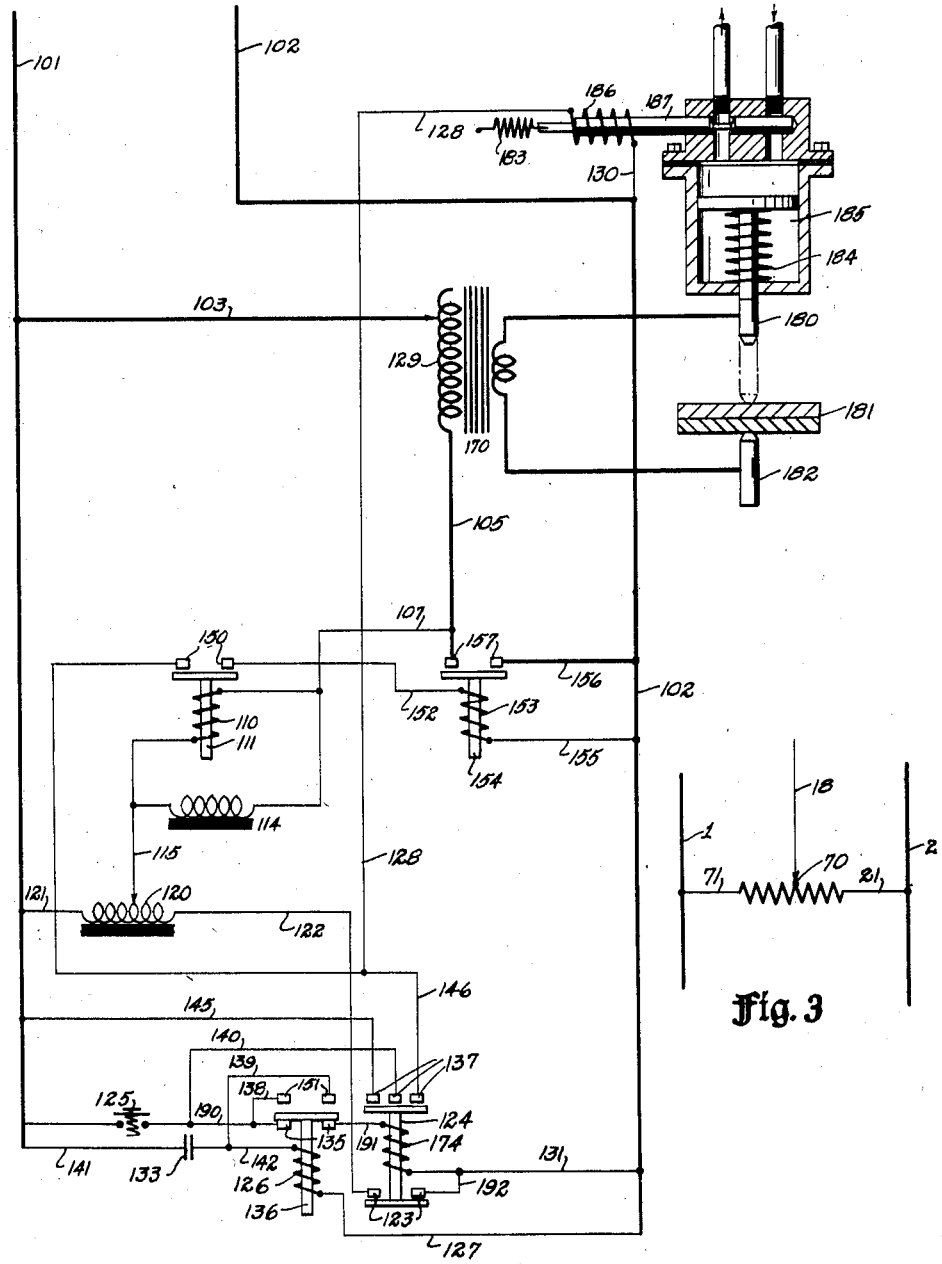
Fig. 2 is a similar diagram of another embodiment of my invention.
Fig. 3 is a modification in part of one of the circuit members of either of Figs. 1 or 2.

In the embodiment illustrated in Fig. 2, I have included a reactor 114 in parallel with the winding 110 of the relay 111, the purpose of the insertion of the reactor being to compensate in changes made in the position of the tap of the primary winding 129. The reactor absorbing a considerable amount of power compensates for any changes made in the position of the tap of the primary winding 129 so that the operating characteristics of the relay 111 may remain the same as those of the circuits heretofore described in connection with Fig. 1.

With the application of a source of energy to the supply lines 101 and 102 no circuit is as yet completed. In this respect the arrangement differs from the embodiment illustrated in Fig. 1. In Fig. 2 the closure of push button 125 completes the push button circuit from supply line 101 through push button 125, conductor 190, contacts 135 of relay 136, conductor 191, winding 174 of relay 124, conductor 131 to supply line 102.

This push button circuit energizes the winding 174 of relay 124, closing the normally open contacts 137 and 123 of the relay 124. A holding circuit is provided for the push button circuit in order to insure a continued energization of the winding 174 of relay 124 included in said circuit during the welding period, permitting the push button to be released, the holding circuit being from supply line 101, conductor 145, contacts 137 of relay 124, conductors 140 and 190, contacts 135 of relay 136, conductor 191, winding 174 of relay 124, conductor 131 to the supply line 102.

Closure of contacts 137 completes a circuit, energizing the winding 186 of the control valve 187 by a circuit from the supply line 101, conductor 145, contacts 137 of relay 124, conductors 146, 128, winding 186 of this control valve 187, and a conductor 130 to the supply line 102. The energization of the winding 174 of relay 124 closing contacts 123 also completes an energization circuit for the auto-transformer 120 from supply line 101, conductor 121, auto-transformer 120, conductor 122, contacts 123 of relay 124, conductors 192, 131 to supply line 102.

By the actuation of control valve 187, pressure enters the cylinder 185, moving the electrode 180 to effect electrical contact with the work-pieces 181 and the stationary electrode 182.

Also at the time of the closure of contacts 123 by the energization of the winding 174 of the relay 124, the relay circuit is completed from the supply line 101, conductor 103, primary winding 129 of welding transformer 170, conductors 105 and 107, winding 110 of relay 111 in parallel with the reactor 114, conductor 115, to the intermediate tap of auto-transformer 120, conductor 122, contacts 123 of relay 124, conductors 192 and 131, to supply line 102.

The primary winding 129 of the transformer 170 acting as an impedance device retards the current passing through the relay circuit and prevents the operation of relay 111. However, upon the completion of the secondary circuit of the transformer 170 by the bringing of the electrodes 180 and 182 into electrical contact with the work-piece 181, the impedance is reduced materially, thus allowing sufficient current to pass through the relay circuit, to energize the winding 110 of relay 111, and thus close contacts 150 of the same relay. Closure of the contacts 150 of relay 111 completes the circuit to the operating winding 153 of the welding switch 154, the circuit being from supply line 101, conductor 145, contacts 137 of relay 124, conductor 146, contacts 150 of relay 111, conductor 152, winding 153 of switch 154, conductor 155 to the supply line 102.

The closure of the circuit including the winding 153 of the welding switch 154 closes the contacts 157 of the welding switch and starts the welding period by the completion of the work circuit from supply line 101, conductor 103, primary winding 129 of welding transformer 170, conductor 105, contacts 157 of main switch 154, conductor 156 to the supply line 102.

The welding period being completed, the normally open contacts 133 of the timer (not shown) are closed, completing the timer circuit from the supply line 101, conductor 141, contacts 133, conductor 142, winding 126 of relay 136, conductor 127 to the supply line 102, this timer circuit energizing winding 126, causing opening of the contacts 135 and the closure of contacts 151 of relay 136.

The closure of contacts 151 of relay switch 136 forms a holding circuit for the winding 126 of the same switch from supply line 101, conductor 145, contacts 137 of relay 124, conductors 140, 190, 138, contacts 151 of relay 136, conductors 139, 142, winding 126 of relay 136, conductor 127 to the supply line 102. The purpose of this holding circuit is to hold the relay 136 in operative position should the contacts 133 of the timing device open before the winding 174 of relay 124 is completely deenergized and its contacts opened.

The deenergization of relay 124 opens the contacts 137 and 123 of the same relay. The opening of contacts 137 opens the circuit to the main welding switch 154, causing deenergization of the winding 153 of the main welding switch, resulting in an opening of the contacts 157 which in turn open the work circuit, thus terminating the welding period. The opening of contacts 137 also deenergizes the winding 186 of the valve 187, permitting the spring 183 to return the valve to the position shown in the drawings, thereby permitting the spring 184 to disengage the electrode 180 from the work-piece 181.

Further, the opening of contacts 123 of relay 124 opens the auto-transformer circuit and the relay circuit and consequently deenergizes the winding 110 of relay 111, thereby opening contacts 150.

At the expiration of the period during which the contacts 133 of the timing device are to remain closed, the said contacts are then opened, deenergizing the winding 126 of relay 136. The apparatus is now in condition for the beginning of another welding operation, by the closure of the manually operated switch, or push button 125.

Instead of the auto-transformer 20 illustrated in Fig. 1, I may use a resistance device or potentiometer as shown in Fig. 3 in which the conductor 18 is connected to an intermediate tap 70, and the conductors 71 and 21 are connected to the terminals of the resistance device. The auto-transformer 120 illustrated in Fig. 2 may also be replaced by an arrangement such as illustrated in Fig. 3. Other well-known multiple circuit voltage supply devices may be used instead of the auto-transformer, or the resistance device, here shown and described.

The intermediate tap 70 is shown adjustable, so that there may be provided, if desired, a voltage of one value for the actuating circuit of the relay 35 of Fig. 1, or the relay 111 of Fig. 2, and a voltage of a different value for the holding circuit of these relays.

It will be noted that the actuating circuit of the relay includes one portion of the auto-transformer, or resistance device, and that the holding circuit includes another portion thereof. The holding circuit as shown also includes the main welding circuit contacts of the welding switch.

The timer 133 of Fig. 2 may be any automatic timer such as described in the applications of D. C. Wright, United States Letters Patent No. 2,023,631, issued December 10, 1935, and United States Letters Patent No. 2,024,019, issued December 10, 1935.

Having thus described my invention, what I claim is:

1. An apparatus for controlling the flow of electrical energy to a welding circuit including electrodes arranged for receiving work pieces to be welded therebetween, comprising a primary circuit connectible to a source of current and including a primary winding, a secondary winding in inductive relation to the primary winding, and electrically connected to the electrodes, a control circuit electrically operatively associated with the primary circuit, multiple voltage supply means electrically operatively associated with the primary winding for supplying a predetermined voltage thereto, and means operated by the control circuit at a predetermined energization thereof for altering the association of said multiple voltage supply means and said primary winding for supplying a different voltage to said primary winding, said predetermined energization of the control circuit being provided by the change in impedance in the primary winding itself caused by and at the instant of the contact of the electrodes with the work pieces.

2. An apparatus for controlling the flow of electrical energy to a welding circuit including electrodes arranged for receiving work pieces to be welded therebetween, comprising a primary circuit connectible to a source of current and including a primary winding, a secondary winding in inductive relation to the primary winding and electrically connected to the electrodes, a control circuit electrically operatively associated with the primary circuit, voltage reducing means electrically operatively associated with the primary winding, and means operated by the control circuit at a predetermined energization thereof for rendering said voltage reducing means ineffective with respect to the primary winding, said predetermined energization of the control circuit being provided by the change in impedance in the primary winding caused by and at the instant of the combined contact of the electrodes with the work pieces and the work pieces with each other at the zone of the electrodes.

3. An apparatus for controlling the flow of electrical energy to a welding circuit including electrodes arranged for receiving work pieces to be welded therebetween, comprising a primary winding connectible to a source of current, a secondary winding in inductive relation to the primary winding and electrically connected to the electrodes, multiple voltage supply means electrically operatively associated with the primary winding for connecting the winding to the source therethrough in addition to the first mentioned connection of the primary winding to said source, a control circuit electrically operatively associated with the primary winding and energizable through one portion of said multiple voltage supply means, a holding circuit energizable through a second portion of said multiple voltage supply means, switch means operable at a predetermined energization of the control circuit for effecting said first mentioned connection between said primary winding and said source and for rendering said multiple voltage supply means ineffective with respect to the primary winding, said first mentioned connection of said primary winding to said source causing energization of said holding circuit for maintaining said switch means in operative position, said predetermined energization of the control circuit being caused by the change in impedance in the primary winding itself caused by the contact of the electrodes with the work pieces.

4. An apparatus for controlling the flow of electrical energy to a welding circuit including electrodes arranged for receiving work pieces to be welded therebetween, comprising a primary winding connectible to a source of power, a secondary winding in inductive relation to the primary winding and electrically connected to the electrodes, voltage dividing means electrically operatively associated with the primary winding for connecting the winding to the source therethrough in addition to the first mentioned connection of the primary winding to said source, a control circuit electrically operatively associated with the primary winding and energizable from one portion of said voltage dividing means, a holding circuit energizable from a second portion of said voltage dividing means, and switch means operable at a predetermined energization of the control circuit for effecting said first mentioned connection between said primary circuit and said source, the said first mentioned connection of said primary winding to said source causing energization of said holding circuit for maintaining said switch means in operative position, said predetermined energization of the control circuit being caused by the change in impedance in the primary winding itself caused by the contact of the electrodes with the work pieces.

5. An apparatus for controlling the flow of electrical energy to a translating device, comprising a primary circuit connectible to a source of power and including a primary winding, a secondary winding in inductive relation to the primary winding and electrically connected to the electrodes, voltage dividing means connected to said source of power and electrically operatively associated with the primary circuit for supplying a predetermined voltage thereto, a control circuit electrically operatively associated with the primary winding and energizable from one portion of said voltage dividing means, a holding circuit energizable from a second portion of said voltage dividing means, and switching means operable at a predetermined energization of the control circuit for altering the association of said voltage dividing means with said primary circuit while the voltage dividing means remains connected to the primary winding for supplying a different voltage to said primary winding, the altering of the association of said voltage dividing means with said primary circuit causing energization of said holding circuit for maintaining said switching means in operative position, said predetermined energization of the control circuit being effected by the change of impedance of the primary winding caused by operatively connecting said secondary winding to said translating device.

6. An apparatus for controlling the flow of electrical energy to a welding circuit including electrodes arranged for receiving work pieces to be welded therebetween, comprising a primary winding, voltage reduction means in series therewith, a circuit connecting said winding through the voltage reduction means to a source of electrical energy, a secondary winding electrically connected to the electrodes and in inductive relation to the primary winding, a control circuit connected in series with the primary winding and with said voltage reduction means, control means operated by the control circuit when energized to an increased degree to shunt out said voltage reduction means from its series relationship with the primary winding, said control circuit being energized sufficiently for operating said control means at the instant of the combined contact of the electrodes with the work pieces.

7. The combination with an apparatus for controlling the flow of electrical energy to an electrical energy translating device and including a primary winding subjected to a predetermined potential from a source of electrical energy and a secondary winding in inductive relation to the primary winding and connectible to the translating device, of means rendered operative by the change in the impedance of the primary winding resulting from operatively connecting said secondary winding to the translating device for subjecting the primary winding to a different predetermined potential, said means at all times being connected with said primary winding in permanently closed circuit and at all times being arranged for energization from said source.

8. The combination with a transformer having an adjustable primary winding connectible to an alternating current source of constant frequency, and a control circuit including an electro-responsive device having a winding in series with the primary winding and being operative throughout a limited portion only of the range of adjustment of the primary winding for controlling the energization of the primary winding, of an inductive reactance connected in parallel with said winding of said device for rendering said winding operative through substantially the entire range of adjustment of the primary winding.

9. In an electrical power circuit and control circuit combination, operating means for connecting and disconnecting the power circuit to and from a source of power, an operating circuit, a holding circuit, said circuits being operatively associated with the operating means for initially operating said means to connect the power circuit across the source of power and to maintain said connection, respectively, voltage dividing means connected continuously across said source of power, the operating circuit being operatively associable with said source of power through one portion of said voltage dividing means for initially operating the operating means, and the holding circuit being operatively associable with said source of power through the other portion of the voltage dividing means for maintaining said operating means in operated position and being rendered operative consequent upon connecting said power circuit across said source of power.

10. In a combined operating and holding circuit for an electro-responsive control device for controlling an electro-responsive operating device, circuit closing means operatively associated with the operating device, voltage dividing means, connections whereby said electro-responsive control device is operated by completion of a circuit across one portion of said voltage dividing means, operation of said control device causing operation of the electro-responsive operating device and consequent closure of the associated circuit closing means, said closure resulting in the maintenance of a holding circuit for said electro-responsive control device across another portion of said voltage dividing means.

WARD L. SMITH.